United States Patent
Chung et al.

(10) Patent No.: US 7,542,673 B2
(45) Date of Patent: Jun. 2, 2009

(54) FAULT LOCALIZATION APPARATUS FOR OPTICAL LINE IN WAVELENGTH DIVISION MULTIPLEXED PASSIVE OPTICAL NETWORK

(75) Inventors: Yun Chur Chung, Daejeon (KR); Eui Seung Son, Gyeonggi-do (KR); Kyung Woo Lim, Daegu (KR); Kwan Hee Han, Gyeonggi-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 521 days.

(21) Appl. No.: 11/262,738

(22) Filed: Nov. 1, 2005

(65) Prior Publication Data

US 2006/0222364 A1 Oct. 5, 2006

(30) Foreign Application Priority Data

Apr. 4, 2005 (KR) .................. 10-2005-0028187

(51) Int. Cl.
*H04B 10/08* (2006.01)
*H04B 17/00* (2006.01)
(52) U.S. Cl. .................. 398/14; 398/13; 398/21
(58) Field of Classification Search .......... 398/13, 398/14, 16, 21
See application file for complete search history.

(56) References Cited

U.S. PATENT DOCUMENTS 5,778,117 A 7/1998 Inoue et al.
5,905,586 A * 5/1999 Even .................. 398/1
6,118,565 A * 9/2000 Frigo ................. 398/68
2002/0024690 A1 * 2/2002 Iwaki et al. ........... 359/110
2005/0123293 A1 * 6/2005 Maki et al. ............ 398/12
2005/0147412 A1 * 7/2005 Park et al. ............ 398/72

OTHER PUBLICATIONS

Kuniaki Tanaka et al., "In-service Individual Line Monitoring and a Method for Compensating for the Temperature-dependent Channel Drift of a WDM-PON Containing an AWGR Using a 1.6 μm Turn-table OTDR", ECOC 97, Sep. 22-25, 1997, Conference Publication No. 448, © IEE, 1997, pp. 295-298.

* cited by examiner

*Primary Examiner*—Nathan M Curs
(74) *Attorney, Agent, or Firm*—Oliff & Berridge, PLC

(57) ABSTRACT

A fault localization apparatus for an optical line in a wavelength division multiplexed passive optical network is disclosed. The apparatus can detect light loss and fault positions as a channel exhibiting an abnormal receiving state of signals received by each of the upstream receivers is checked, and a monitoring optical signal is used, in which the monitoring optical signal is generated as a pulse is inputted to a light source of the downstream transmitter corresponding to the channel showing such an abnormal receiving state. The apparatus according to the present invention can detect fault positions of optical lines between the central office and the remote nodes and between the remote nodes and the optical network units, since the light source of downstream channel in which faults occur is used as a monitoring light source. The apparatus according to the present invention can be cost-effectively implemented.

9 Claims, 9 Drawing Sheets

FAULT LOCALIZATION APPARATUS FOR OPTICAL LINE IN WAVELENGTH DIVISION MULTIPLEXED PASSIVE OPTICAL NETWORK

BACKGROUND OF THE INVENTION

1. Field of the Invention

The present invention relates to a fault localization apparatus for an optical line, and more particularly to a fault localization apparatus for an optical line in a wavelength division multiplexed passive optical network (WDM PON) in which a downstream light source of a channel having a fault, as a monitoring light source, is used.

2. Description of the Related Art

Recently, as various data services are rapidly increased through the Internet, a large amount of transmission capacity is needed in a subscriber network. In order to efficiently comply with such requirement, a wavelength division multiplexed passive optical network (WDM PON) has attracted considerable attention. Here, the WDM PON is capable of providing a large number of services as optical signals whose wavelengths are different from each other are provided to each subscriber, and a plurality of optical signals are performed by wavelength division multiplexing to be transmitted over a single optical line. Such a WDM PON has advantages in that, as networks are implemented with passive elements to comply with fast transmission of information, networks can be easily installed, maintained and administered, and also extension and security are high. Furthermore, the WDM PON can provide various kinds of services according to wavelengths.

Although such a WDM PON has the above advantages, when substantially implementing the WDM PON, fist of all, economical efficiency and reliability therefor must be considered. In order to efficiently configure the network, various light sources for a WDM PON and methods for cost-effectively implementing elements employed in the network have been researched. Although a large amount of data can be transmitted through the WDM PON, compared with the prior art networks, when a fault occurs in the WDM PON, effects thereof are very serious. Therefore, securing network reliability is very important. In order to improve network reliability, it is necessary to immediately detect any fault in the network and rapidly restore such a detected fault. Also, when improving such network reliability, operations, such as fault detection, sensing of fault position and fault restoration, should be cost-effectively performed.

FIG. 1 is a block diagram of a wavelength division multiplexed passive optical network according to the prior art.

The prior art WDM PON includes a central office CO, a remote node RN and a plurality of optical network units. The central office includes transmitters, receivers and a multiplexer and a demultiplexer having arrayed waveguide gratings (hereinafter, AWGs), such that downstream optical signals which have different wavelengths and are transmitted from the transmitters can be multiplexed by the multiplexers, and then transmitted to the remote nodes through optical lines. The multiplexers/demultiplexers installed in the remote nodes demultiplex the multiplexed downstream optical signals and transmit the optical signals with different wavelengths to each optical network unit. Downstream receivers installed in each optical network unit transform the downstream optical signals to electrical signals to perform communication using the same.

Conversely, upstream optical signals transmitted from the transmitters installed in optical network units are multiplexed by the multiplexer/demultiplexer of the remote nodes, and then transmitted in the upstream direction. After passing through a WDM coupler classifying upstream and downstream optical signals in the central office, the optical signals are demultiplexed by the demultiplexer in the central office, and then are received by the upstream receivers.

A fault in an optical line is detected by determination as to whether the upstream optical signals are normally received. In order to detect such a fault, a monitor is additionally needed therein.

The position of a fault in optical lines connecting the central office with the remote nodes can be detected using a monitor having a single wavelength, since optical signals whose their wavelengths are multiplexed are passes through the same optical line. However, since the optical lines connecting the remote nodes with the optical network units pass optical signals whose wavelengths are different from each other therethrough, a monitor, which has a plurality of light sources to comply with the wavelengths of the optical lines or a light source whose wavelength can be varied, is used in order to detect positions of optical line faults. [Reference: Kuniaki Tanaka, et al., "In-service Individual Line Monitoring and a Method for Compensating for the Temperature-dependent Channel-Drift of a WDM-PON Containing an AWGR Using a 1.6 µm Tunable OTDR," European Conference on Optical Communication (ECOC '97), no. 488, pp. 295-298, September 1997.] Otherwise, the apparatus must be constructed such that path of signal light and monitoring light is separated in front of the multiplexer/demultiplexer of the remote node, and then the separated monitoring light is recoupled in a path used by a channel of each optical network unit after the multiplexer/demultimplexer.

However, the apparatus having such a structure has disadvantages in that a relatively expensive light source whose wavelength is tunable must be used or network complexity is increased since a plurality of light sources must be used, thereby decreasing network cost-effectiveness.

SUMMARY OF THE INVENTION

Therefore, the present invention has been made in view of the above problems, and it is an object of the present invention to provide a fault localization apparatus for an optical line in a wavelength division multiplexed passive optical network (WDM PON), which is capable of being efficiently administrated and improving network reliability.

In accordance with a first aspect of the present invention, the above and other objects can be accomplished by the provision of a fault localization apparatus for an optical line in a wavelength division multiplexed passive optical network (WDM PON) comprising: a central office, a remote node, and optical network units.

Here, the central office installs downstream transmitters and upstream receivers therein. The remote node is connected with the central office via an optical line. The optical network units connected with the remote node via optical lines.

Here, a channel exhibiting an abnormal receiving state of signals received by each of the upstream receivers is checked, a monitoring optical signal is outputted from the central office, in which the monitoring optical signal is generated as a pulse is inputted to a light source of a downstream transmitter corresponding to the channel showing such an abnormal receiving state, such that, according to time while the monitoring optical signal is transmitted, magnitude of the monitoring signal is measured to detect light loss and fault positions, in which the monitoring optical signal is transmitted through the optical line connecting the central office with the remote node or through the optical lines connecting the remote node with the optical network units.

In accordance with a second aspect of the present invention, the above and other objects can be accomplished by the provision of a fault localization apparatus for an optical line in a wavelength division multiplexed passive optical network (WDM PON) comprising: a central office, a remote node, and optical network units, Here, the central office includes a multiplexer connected to downstream transmitters and a demultiplexer connected to upstream receivers. The remote node includes a multiplexer/demultiplexer connected to the multiplexer and the demultiplexer of the central office through a first optical line and passive elements. The optical network units are connected to the multiplexer/demultiplexer through a plurality of second optical lines, respectively.

Here, a channel exhibiting an abnormal receiving state of signals received by each of the upstream receivers is checked, a monitoring optical signal is inputted to the multiplexer of the central office, in which the monitoring optical signal is generated as a pulse is inputted to a light source of an downstream transmitter corresponding to the channel showing such an abnormal receiving state, such that, according to time while the monitoring optical signal is transmitted through the first optical line and the second optical lines, magnitude of the monitoring signal is measured to detect light loss and fault positions.

Preferably, the fault localization apparatus for an optical line further comprises: a pulse generator generating pulses; a 2×1 switch which is installed in each of the downstream transmitter, and connects a data signal generator or a pulse generator with a light source of the downstream transmitter; a passive element, installed between the multiplexer and a coupler, for changing paths of monitoring optical signals outputted through the multiplexer which are scattered or reflected backwards; a wavelength tunable band pass filter connected to the passive element; a controller checking whether the upstream receivers receive signals to check a channel exhibiting an abnormal receiving state, and controlling the 2×1 switch, such that a light source of a downstream transmitter which is selected from among the downstream transmitters is connected to the pulse generator when none of the upstream receivers receive signals, or such that a light source of a downstream transmitter which has the same channel as the upstream receivers is connected to the pulse generator, when any one upstream receiver does not receive a signal, and tuning the center wavelength of the wavelength tunable band pass filter to the wavelength of the monitoring optical signal; and a receiver for monitoring signal for inputting the monitoring optical signals from the wavelength tunable band pass filter, changing the inputted monitoring optical signals into electrical signals, converting magnitude variation of monitoring signal based on time lapse into an optical loss value according to a distance of the first optical line or the second optical line, and then outputting the converted values.

Preferably, the controller controls the 2×1 switches such that each light source of the downstream transmitter, which has the same channel as the upstream receivers, is connected to the pulse generator in order in a predetermined sequence, when more than two of the upstream receivers do not receive signals, and tunes the center wavelength of the wavelength tunable band pass filter to a wavelength of a downstream transmitter connected to the pulse generator, respectively.

In accordance with a third aspect of the present invention, the above and other objects can be accomplished by the provision of a fault localization apparatus for an optical line in a wavelength division multiplexed passive optical network (WDM PON) comprising: a central office, a remote node, and optical network units.

The central office includes a multiplexer connected to downstream transmitters and a demultiplexer connected to upstream receivers.

The remote node includes a demultiplexer connected to the multiplexer of the central office through a first optical line, and a multiplexer connected to the demultiplexer of the central office through a second optical line which is installed therein together with the first optical line; and Each of optical network units includes a downstream receiver connected to the demultiplexer of the remote node through a third optical line and an upstream transmitter connected to the multiplexer of the remote node through a fourth optical line which is installed therein together with the third optical line.

Here, a channel exhibiting an abnormal receiving state of signals received by each of the upstream receivers is checked, a monitoring optical signal is inputted to the multiplexer of the central office, in which the monitoring optical signal is generated as a pulse is inputted to a light source of a downstream transmitter corresponding to the channel showing such an abnormal receiving state, such that, according to time while the monitoring optical signal is transmitted through the first optical line or the third optical lines, magnitude of the monitoring signal is measured to detect light loss, thereby detecting light loss and fault positions.

Preferably, the fault localization apparatus for an optical line further comprises: a pulse generator generating pulses; a 2×1 switch which is installed in each of the downstream transmitter, and connects a data signal generator or a pulse generator with a light source of the downstream transmitter; a passive element, installed in the first optical line, for changing paths of monitoring optical signals outputted through the multiplexer of the central office which are scattered or reflected backwards; a wavelength tunable band pass filter connected to the passive element; a controller checking whether the upstream receivers receive signals to check a channel exhibiting an abnormal receiving state, and controlling the 2×1 switch, such that a light source of a downstream transmitter which is selected from among the downstream transmitters is connected to the pulse generator when all of the upstream receivers do not receive signals, and such that a light source of a downstream transmitter which operates on the same channel as the upstream receivers is connected to the pulse generator, when any one upstream receiver does not receive a signal, and tuning the center wavelength of the wavelength tunable band pass filter to the wavelength of the monitoring optical signal; and a receiver for monitoring signal for inputting the monitoring optical signals from the wavelength tunable band pass filter, changing the inputted monitoring optical signals into electrical signals, converting magnitude variation of monitoring signal based on time lapse into an optical loss value according to distance of the first optical line or the third optical line, and then outputting the converted values.

Preferably, the controller controls the 2×1 switches such that each light source of the downstream transmitter, which has the same channel as the upstream receivers, is connected to the pulse generator in order in a predetermined sequence, when more than two of the upstream receivers do not receive signals, and tunes the center wavelength of the wavelength tunable band pass filter to a wavelength of a downstream transmitter connected to the pulse generator, respectively.

Preferably, the fault localization apparatus for an optical line further comprises: a pulse generator generating pulses; a 2×1 switch connecting a data signal generator or the pulse generator with a light source of the downstream transmitter; a passive element, installed in an optical line connecting a downstream transmitter with a multiplexer of the central office, for changing paths of the monitoring optical signal outputted through the multiplexer of the central office, which are scattered or reflected backwards; a controller checking whether the upstream receivers receive signals, and controlling the 2×1 switch such that a light source of a downstream transmitter is connected to the pulse generator if an abnormal receiving state is detected; and a receiver for monitoring signal for inputting the monitoring optical signals from the passive element, changing the inputted monitoring optical signals into electrical signals, converting magnitude variation of monitoring signals based on time lapse into optical loss values according to distance of the first optical line or the third optical line, and then outputting the conversion values.

Here, the fault localization apparatus is installed at each channel.

In accordance with a fourth aspect of the present invention, the above and other objects can be accomplished by the provision of: a fault localization apparatus for an optical line in a wavelength division multiplexed passive optical network (WDM PON) comprising: a central office, a remote node, and optical network units.

The central office includes a multiplexer/demultiplexer whose ports are connected to a passive element and a set of a downstream transmitter and an upstream receiver.

The remote node includes a multiplexer/demultiplexer connected to the multiplexer/demultiplexer of the central office through a first optical line.

The optical network units are connected to a second multiplexer/demultiplexer of the remote node through a plurality of second optical lines, respectively.

Here, a channel exhibiting an abnormal receiving state of signals received by each of the upstream receivers is checked, a monitoring optical signal is inputted to the multiplexer/demultiplexer of the central office, in which the monitoring optical signal is generated as a pulse is inputted to a light source of a downstream transmitter corresponding to the channel showing such an abnormal receiving state, such that, according to time while the monitoring optical signal is transmitted through the first optical line or the second optical lines, monitoring signal magnitude is measured to detect light loss and fault positions.

Here, the fault localization apparatus for an optical line further comprises: a pulse generator generating pulses; a 2×1 switch connecting a data signal generator or the pulse generator with a light source of the downstream transmitter; a passive element, installed in an optical line connecting a downstream transmitter with a passive elements, for changing paths of the monitoring optical signal outputted through the multiplexer/demultiplexer of the central office, which are scattered or reflected backwards; a controller checking whether the upstream receivers receives signals, and controlling the 2×1 switch such that a light source of a downstream transmitter is connected to the pulse generator if an abnormal receiving state is detected; and a receiver for monitoring signal for inputting the monitoring optical signals from the passive element, changing the inputted monitoring optical signals into electrical signals, converting magnitude variation of the monitoring signal based on time lapse into an optical loss value according to distance of the first optical line or the second optical line, and then outputting the conversion values.

Here, the fault localization apparatus is installed at each of the passive elements and a set of the downstream transmitter and the upstream receiver.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Referring to the attached drawings, preferred embodiments of the present invention are described in detail below.

A fault localization apparatus for an optical line according to the present invention employs a prior art downstream light source used for downstream data transmission as a monitoring pulse light source, and analyzes loss traces of light pulses scattered or reflected from the optical line, thereby detecting positions of faults in the optical line. Namely, of the signals received by each upstream receiver installed in the central office, a channel exhibiting an abnormal receiving state is checked, a pulse is inputted to a light source of the downstream transmitter corresponding to the channel exhibiting an abnormal receiving state of the downstream transmitters installed in the central office, and then a monitoring signal generated, as the pulse is inputted to the light source, is outputted from the central office. After that, optical signal magnitudes are measured while the monitoring signals are transmitted through optical lines connecting the central office with the remote node, or through optical lines connecting the remote nodes with the optical network units, so that light loss and fault position are checked. Here, the term "optical signal magnitude" means intensity of light power and can be represented by voltage or current intensity, etc.

The fault localization apparatus for an optical line based on preferred embodiments of the present invention is described below. The embodiments, which will be described later, are implemented in each of wavelength division multiplexed passive optical networks (WDM PONs), which does not limit the scope of the present invention, rather there may be many modifications therefrom within the spirit of the present invention.

Embodiment 1

Figure 1:
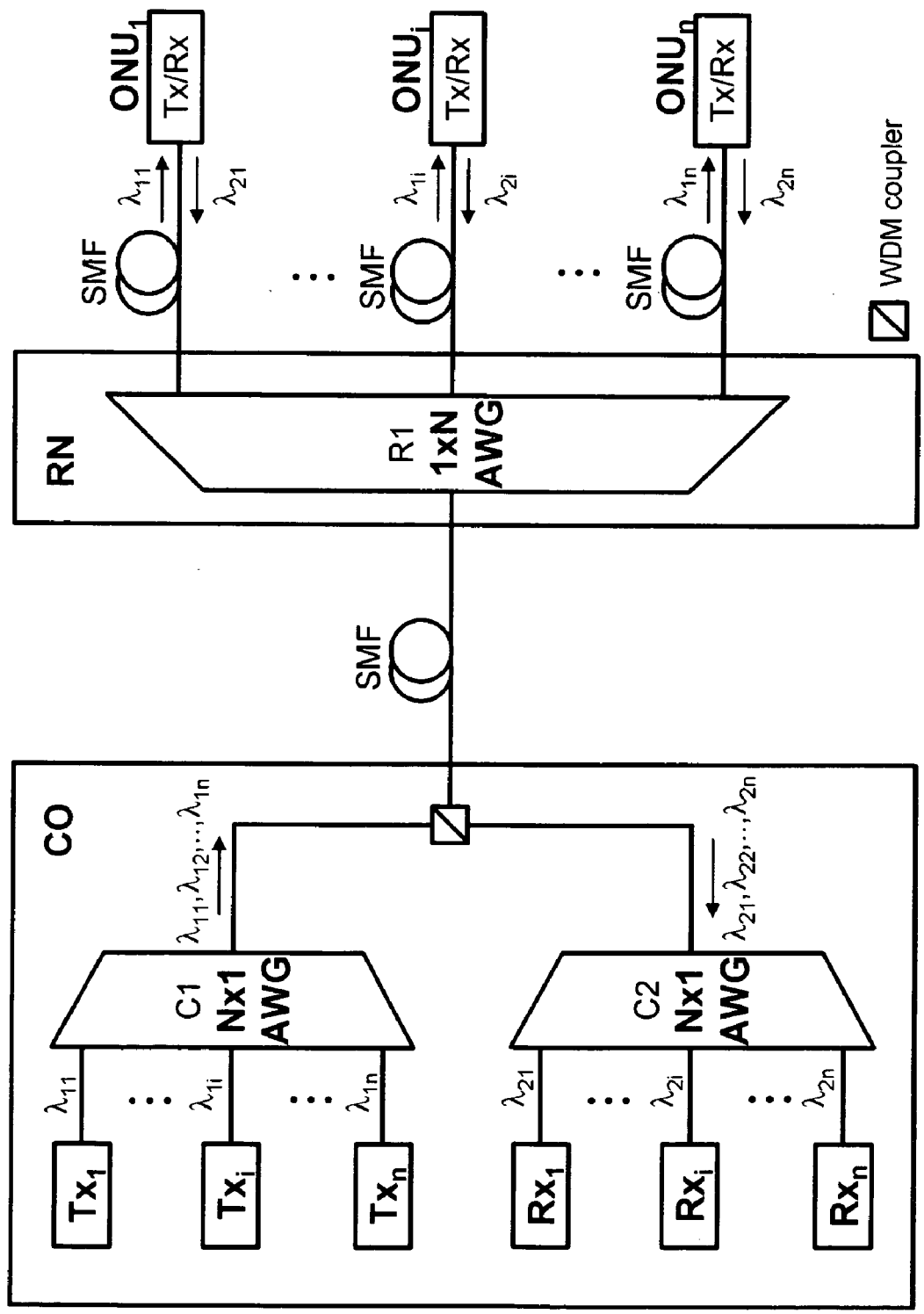
FIG. 1 is a block diagram of a wavelength division multiplexed passive optical network according to the prior art.
Figure 2:
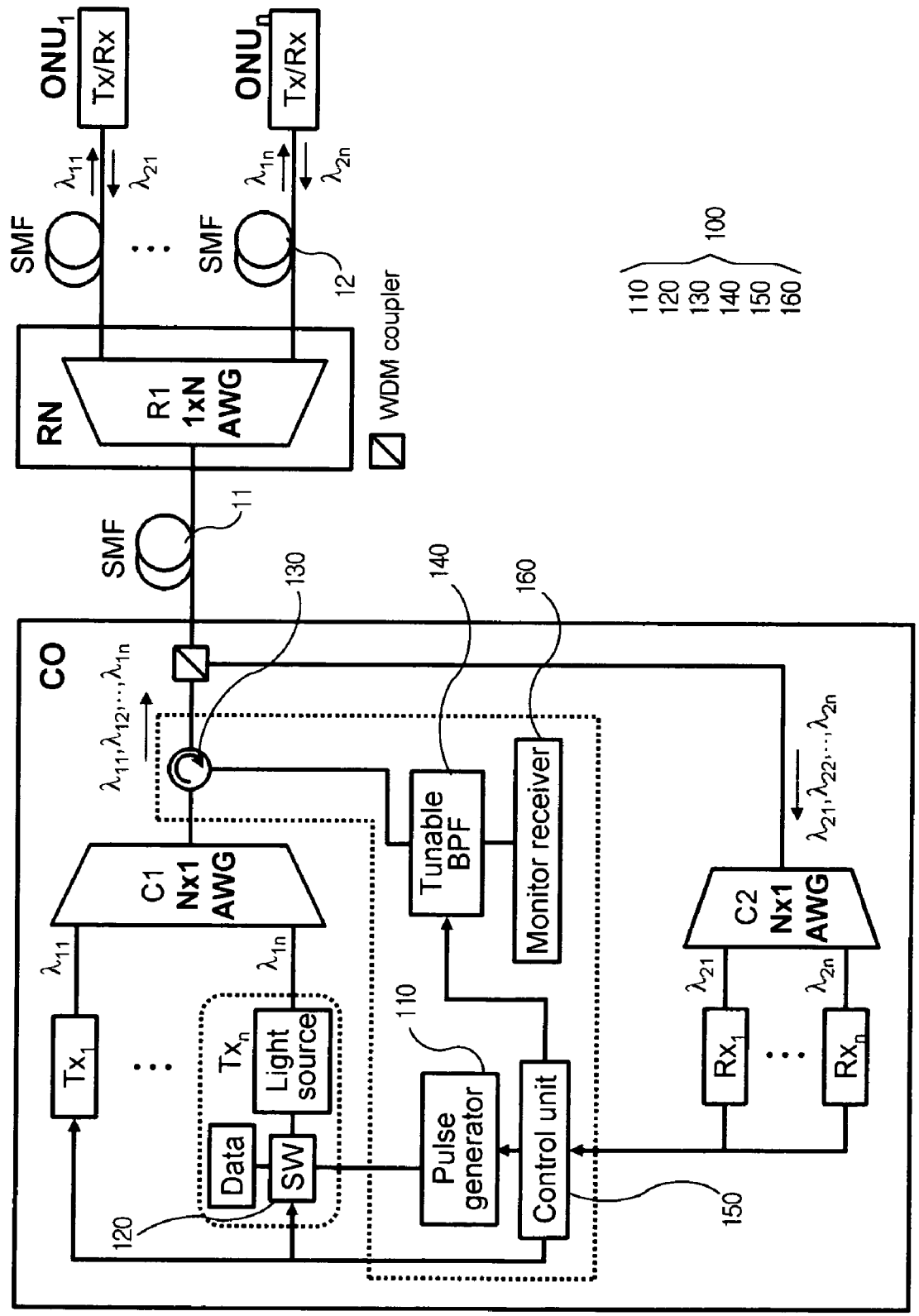
FIG. 2 is a block diagram of a bidirectional wavelength division multiplexed passive optical network in which a fault localization apparatus for an optical line according to a first embodiment of the present invention.

FIG. 2 is a block diagram of a bi-directional wavelength division multiplexed passive optical network in which a fault localization apparatus for an optical line according to a first embodiment of the present invention is installed.

Referring to FIG. 2, a central office CO of a WDM PON includes a multiplexer which is configured by an AWG and is connected to downstream transmitters Tx, hereinafter the multiplexer is referred to as C1 N×1 AWG, and a demultimplexer which is configured by an AWG and connected to upstream receivers Rx, hereinafter the demultiplexer is referred to as C2 N×1 AWG. A remote node RN includes a multiplexer/demultiplexer (hereinafter, referred to as R1 1×N AWG), which is configured by an AWG and performs multiplexing and demultiplexing. The R1 1×N AWG is connected to the C1 N×1 AWG and C2 N×1 AWG in the central office through a first optical line 11 and a WDM coupler as a passive element, and is connected to the optical network units through a plurality of optical lines 12.

The WDM PON is an example of general network constructions and its detailed operation is described below.

Data signals in the central office CO are converted into downstream optical signals by light sources of the downstream transmitter Tx whose wavelengths are different from each other. The converted downstream optical signals are multiplexed by the C1 N×1 AWG and are then transmitted to the remote nodes. The upstream optical signals from the remote nodes RN are separated from the downstream optical signals through the WDM coupler, and then demultiplexed by the C2 N×1 AWG to be received by the upstream receiver Rx.

The R1 1×N AWG of the remote node demultiplexes the multiplexed downstream optical signals from the central office CO, and transmits the multiplexed optical signals to the ONU based on the wavelengths thereof. Also, the R1 1×N AWG multiplexes the upstream optical signals having various wavelengths, transmitted from the ONUs, and transmits them to the central office CO.

The ONU is a terminal of the optical communication network, which provides a service interface to end-users. The ONU includes a downstream receiver Rx converting downstream optical signals from the remote node into electrical signals, and an upstream transmitter tx converting the data signals into upstream optical signals to be transmitted to the remote node RN.

The fault localization apparatus for an optical line according to the present invention, which is installed in the WDM PON, includes a pulse generator 110, a 2×1 electrical switch 120, a passive element 130, a wavelength tunable band pass filter 140, a controller 150, and a receiver for monitoring signal 160.

The pulse generator 110 inputs synchronous signals from the controller 159 and generates a pulse whose pulse width is narrow and whose period is relatively long, which is referred to as a monitoring pulse. The pulse width determines a spatial resolution ability discriminating position of a fault in the optical line, in which the spatial resolution ability is expressed by the following equation (1):

$$S = \frac{C}{2n}W \quad (1)$$

Wherein, S is spatial resolution ability, C is the speed of light in a vacuum, n denotes the refractive index of the optical line, and W denotes pulse width.

Also, the pulse period is used to determine the maximum length of an optical line, which is measured by the following equation (2):

$$R = \frac{C}{2n}T \quad (2)$$

Where, S is maximum length of measured optical line, C is the speed of light in a vacuum, n denotes the refractive index of the optical line, and T denotes pulse period.

The 2×1 electrical switch 120 in installed in respective transmitters, and connects a data signal generator or a pulse generator 110 with a light source according to control signals of the controller 150. Namely, when there is no fault in the optical line, data signals can be applied to a downstream light source, and when a fault occurs in an optical line, the monitoring pulse can be applied to the downstream light source.

The passive element 130 includes an optical circulator or a coupler, and is installed between the C1 N×1 AWG of a multiplexer of the central office and the WDM coupler of a passive element. The passive element 130 changes paths of signals which are transmitted through the first optical line 11 or the second optical line 12 and are scattered or reflected backward.

The controller 150 checks whether upstream receivers connected to the C2 N×1 AWG of the central office receive signals and detects a channel exhibiting an abnormal receiving state. After that, the controller 150 controls the pulse generator 110, the 2×1 electrical switch 120 and the wavelength tunable band pass filter 140. If all of the upstream receivers do not receive signals, it determines that a fault occurs in the first optical line 11. On the other hand, if one of the upstream receivers does not receive signals, it determines that a fault occurs in the second optical line 12 in which the channel of the receiver is included. Therefore, when none of the upstream receivers receives signals, the 2×1 switch 120 is controlled such that a light source of any one downstream transmitter connected to the C1 N×1 AWG of the central office is connected to the pulse generator 110, and also controls the pulse generator 110 such that a monitoring pulse is generated from the pulse generator 110, thereby monitoring optical signals corresponding to the monitoring pulse, which is generated in the pulse generator 110, into the C1 N×1 AWG. Also, when any one of the upstream receivers does not receive signals, the 2×1 switch 120 is controlled such that a light source of a transmitter corresponding to a channel of the upstream receiver can be connected to the pulse generator 110, thereby inputting the monitoring optical signals into the C1 N×1 AWG. Therefore, the monitoring optical signals or data optical signals outputted from the transmitter through other channels of the transmitter with the monitoring optical signals are multiplexed in the C1 N×1 AWG, and then transmitted through the first optical line 11, or multiplexed in the R1 1×N AWG of the remote node and then transmitted through the second optical line 12. Here, the multiplexed signals outputted from the C1 N×1 AWG are scattered or reflected backwards at each position of the first optical line 11, and the changed its path in the passive element 130 to be inputted to the wavelength tunable band pass filter 140. Also, the monitoring optical signals demultiplexed in the R1 1×N AWG of the remote node are scattered or reflected backwards at each position of the second optical line 12, and then multiplexed in the R1 1×N AWG of the remote node together with other optical signals to be inputted to the wavelength tunable band pass filter 140 through the first optical line 11 and the passive element 130. As such, when the signals are inputted to the wavelength tunable band pass filter 140, the controller 150 tunes the center wavelength of the wavelength tunable band pass filter 140 to the wavelength of the monitoring optical signal, such that optical signals except for such monitoring optical signals can be restrained instead signal-to-ratio of the monitoring optical signal can be increased. The monitoring optical signals passing through the wavelength tunable band pass filter 140 are inputted to a receiver 160 for monitoring signals.

The receiver for monitoring signal 160 changes the inputted monitoring optical signals into electrical signals, converts magnitude variation of monitoring signal based on time lapse into an optical loss value according to distance of the first optical line 11 or the second optical line 12 and then outputs the converted values. Regarding optical line loss, distance until a connection point and connection loss, and damage of optical line, the optical loss value according to the distance of the optical line makes it easy to measure a distance to the damage point, etc. Here, in order to increase signal-to-ratio of the monitoring signals, when averaging the periodically inputted monitoring signals, the signal to ratio is increased by $1.5 \log_2 N$, according to the number N of averaging.

On the other hand, when faults occur simultaneously or successively in more than one of second optical lines 2 which connect the remote node to the ONU, namely, when more than two of the upstream receivers do not receive signals, the controller 150 controls the 2×1 switch 120 such that each light source of the downstream transmitter which has the same channel as the upstream receivers is connected to the pulse generator 110 in order in a predetermined sequence. Also, the controller 150 tunes the center wavelength of the wavelength tunable band pass filter 140 to a wavelength of a downstream transmitter connected to the pulse generator 110 in order. Therefore, the receiver for monitoring signals 160 measures backward scattering signals for each monitoring optical signal in order. Here, any sequence, wherein each light source of downstream transmitters is connected to the pulse generator 110, may be utilized.

Embodiment 2

Figure 3:
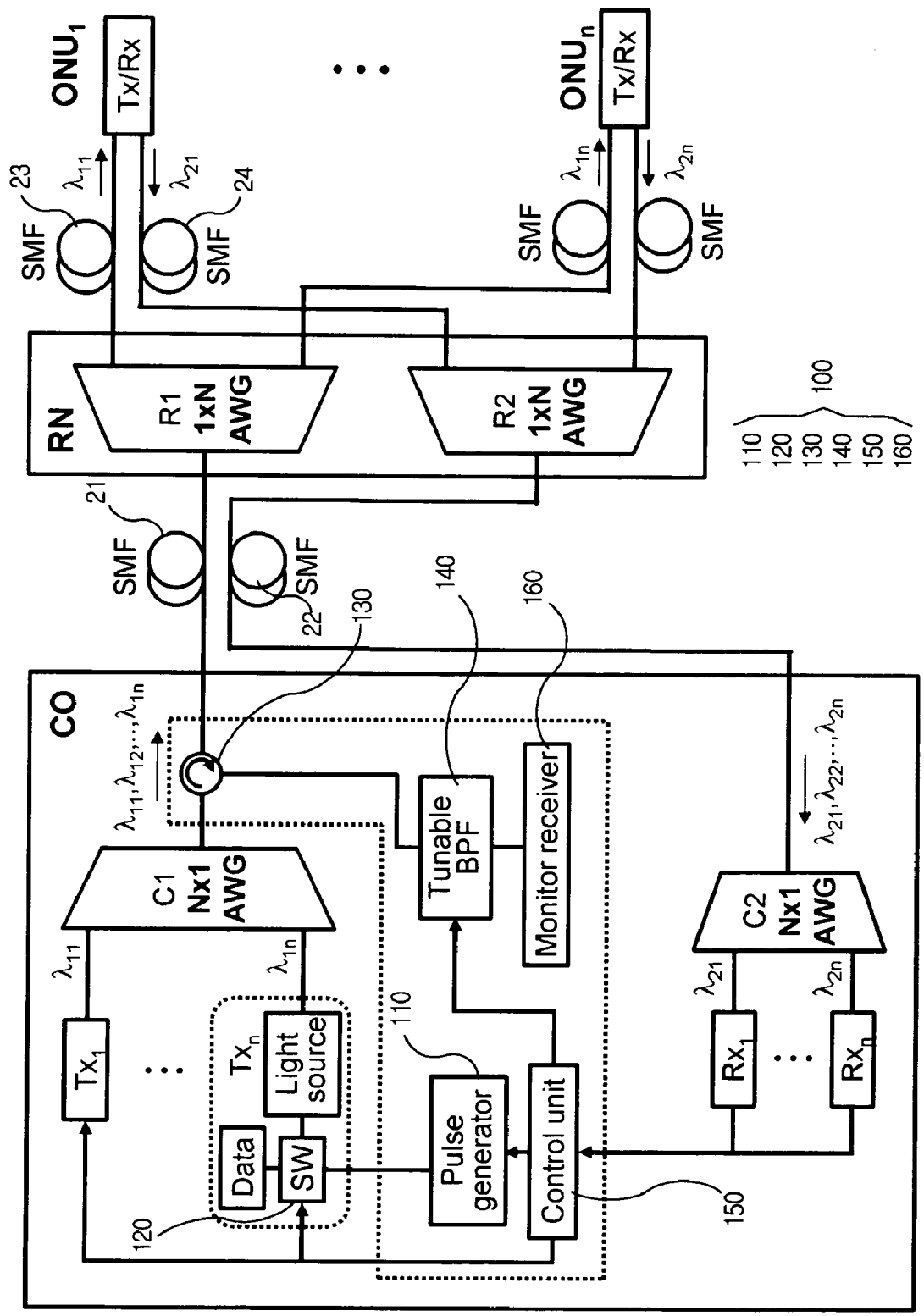
FIG. 3 is a block diagram of a unidirectional wavelength division multiplexed passive optical network in which a fault localization apparatus for an optical line according to a second embodiment of the present invention.

FIG. 3 is a block diagram of a unidirectional wavelength division multiplexed passive optical network in which a fault localization apparatus for an optical line according to a second embodiment of the present invention is installed.

The concept of the second embodiment of the present invention is identical to that of the first embodiment, except for constructions of WDM PONs therebetween. Therefore due to such a slight difference in the construction of the WDM PONs, configuration and operation of the fault localization apparatuses are also different. In the description of the second embodiment of the present invention given below, description of elements identical to those of the first embodiment will be omitted.

Referring to FIG. 3, a central office CO of a WDM PON includes a multiplexer which is configured by an AWG and connected to downstream transmitters, in which the multiplexer is hereinafter referred to as C1 N×1 AWG, and a demultiplexer which is configured by an AWG and connected to upstream receivers, in which the demultiplexer is hereinafter referred to as C2 N×1 AWG. A remote node RN includes a multiplexer which is configured by an AWG and connected to downstream receivers of optical network units, in which the multiplexer is hereinafter referred to as R1 1×N AWG, and a demultiplexer which is configured by an AWG and connected to upstream transmitters of the optical network units, in which the demultiplexer is hereinafter referred to as R2 1×N AWG. Here, the C1 N×1 AWG and the R1 1×N AWG are connected to each other via a first optical line 21, and the C2 N×1 AWG and the R2 1×N AWG are connected to each other via a second optical line 22. Also, the R1 1×N AWG is connected to each downstream receiver of the optical network units through third optical lines 23, and the R2 1×N AWG is connected to each upstream transmitter of the optical network units through fourth optical lines 24. Here, the first optical line 21 and the second optical line 22 are installed therein together, and the third and the fourth optical lines 23 and 24 are also installed therein together.

When comparing the WDM PON of the second embodiment of the present invention with that of the first embodiment, the remote node of the first embodiment of the present invention employs a multiplexer/demultiplexer, but the remote node of the second embodiment uses a multiplexer and a demultiplexer, respectively. Also, the WDM PON of the first embodiment is a network for a bi-directional system, employing a first single optical line and a WDM coupler, such that an upstream signal and a downstream signal can be separated, but the WDM PON of the second embodiment is a network for a unidirectional system, such that a downstream signal is transmitted through the first and third optical lines 21 and 23 and an upstream signal is transmitted through the second and fourth optical lines 22 and 24.

The fault localization apparatus 100 for an optical line according to the second embodiment of the present invention, which is installed in the WDM PON, includes a pulse generator 110, a 2×1 electrical switch 120, a passive element 130, a wavelength tunable band pass filter 140, a controller 150, a receiver for monitoring signals 160. The function of the fault localization apparatus according to the second embodiment is the same as that of the first embodiment, except that the controller 150 detects faults of the optical lines based on determination as to whether signals transmitted through the second and fourth optical lines 22 and 24 are received by the upstream receivers connected to the C2 N×1 AWG, and fault positions while the monitoring optical signals are transmitted through the first and third optical lines 21 and 23. Here, such a structure is constructed on the basis of the rational that when the first and the second optical lines 21 and 22 are installed therein together and a fault occurs in the second optical line 22 due to physical impact, etc., the first optical line 21 also suffers a fault, and thus the faults of the first and second optical lines occur at almost the same position. Also, when a fault occurs in the fourth optical line 24, the third optical line 23 also suffers a fault, and the fault of the third and fourth optical lines occur at almost the same position.

Embodiment 3

Figure 4:
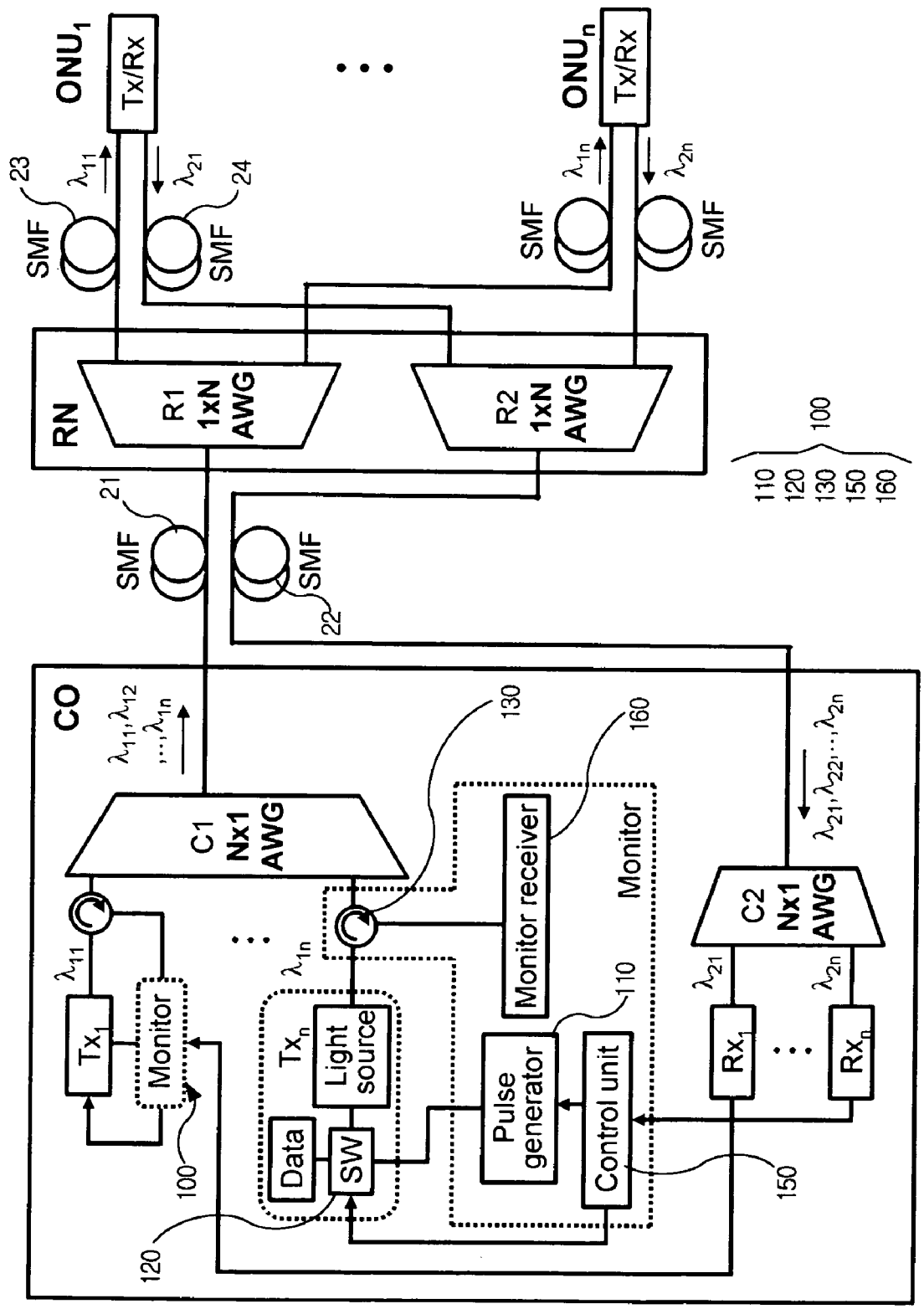
FIG. 4 is a block diagram of a unidirectional wavelength division multiplexed passive optical network in which a fault localization apparatus for an optical line according to a third embodiment of the present invention.

FIG. 4 is a block diagram of a unidirectional wavelength division multiplexed passive optical network in which a fault localization apparatus for an optical line according to a third embodiment of the present invention is installed.

The third embodiment of the present invention is constructed such that the fault localization apparatus for an optical line 100 according to the present invention is installed in the WDM PON of the second embodiment based on channels. As such, since the apparatus is installed in each channel, the third embodiment does not need such a wavelength tunable band pass filer of the second embodiment, and, instead, has advantages in that, when faults are simultaneously or successively encountered in more than one of third optical lines connecting with a remote node and optical network units, positions of such faults can be detected.

Embodiment 4

Figure 5:
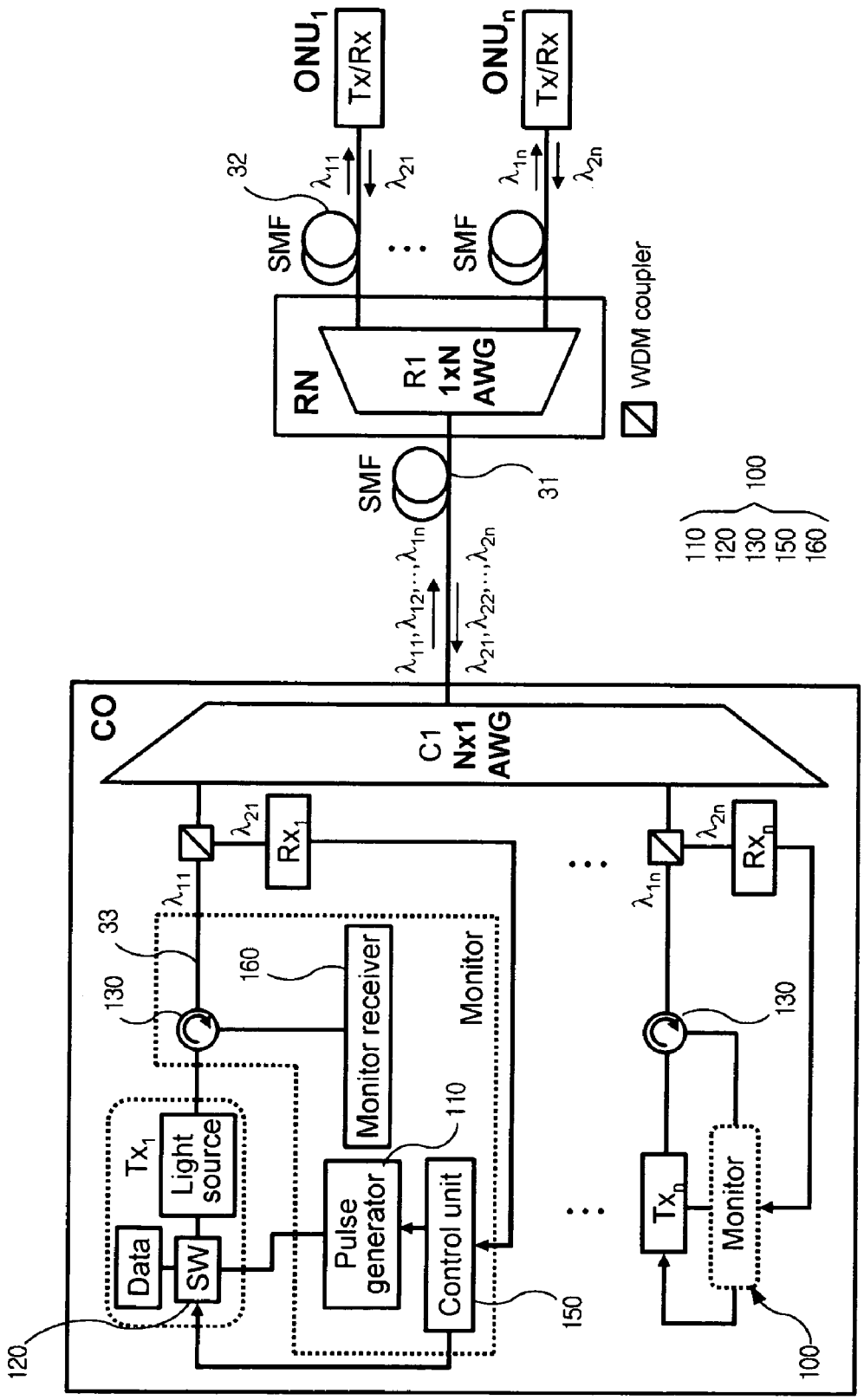
FIG. 5 is a block diagram of a bidirectional wavelength division multiplexed passive optical network in which a fault localization apparatus for an optical line according to a fourth embodiment of the present invention.

FIG. 5 is a block diagram of a bi-directional wavelength division multiplexed passive optical network in which a fault localization apparatus for an optical line according to a fourth embodiment of the present invention is installed.

The concept of the fourth embodiment of the present invention is identical to that of the above-described embodiments, except for constructions of WDM PONs therebetween. Therefore due to such a little difference in the construction of the WDM PONs, configuration and operation of the fault localization apparatuses are also different therebetween. In the description of the second embodiment of the present invention given below, description of elements identical to those of the first embodiment will be omitted.

Referring to FIG. 5, a central office CO of a WDM PON includes a multiplexer/demultiplexer having an AWG, which is hereinafter referred to as a C1 N×1 AWG. Each port of the C1 N×1 AWG is connected to a WDM coupler, and a downstream transmitter/an upstream receiver as a set. A remote node RN is connected to the C1 N×1 AWG of the central office through a first optical line 31, and includes a multiplexer/demultiplexer having an AWG, which is hereinafter referred to as an R1 1×N AWG. The R1 1×N AWG is connected to the ONUs through a plurality of optical lines 32, respectively.

When comparing the WDM PON of the fourth embodiment of the present invention with that of the fist embodiment, the central office of the first embodiment employs a multiplexer and a demultiplexer, but the central office of the fourth embodiment employs a multiplexer/demultiplexer to which a downstream transmitter and upstream receiver are connected, respectively, using a WDM coupler such that downstream signals inputted to the multiplexer/demultiplexer and upstream signals from the multiplexer/demultiplexer are separated.

The fault localization apparatus 100 for an optical line according to the fourth embodiment of the present invention which is installed in the WDM PON, includes a pulse generator 110, a 2×1 electrical switch 120, a passive element 130, a controller 150, a receiver for monitoring signals 160. The function of the fault localization apparatus according to the fourth embodiment is the same as that of the above-described embodiments, except that the fault localization apparatus 100 for an optical line is installed at the WDM coupler and every set of the downstream transmitter/upstream receiver, or at each channel. Here, the passive element 130, which changes paths of monitoring optical signals scattered or reflected backwards, is installed on the optical line 33 connecting the downstream transmitter to the WDM coupler, and the receiver 169 for monitoring signals is directly connected to the passive element 130. Namely, according to the fourth embodiment of the present invention, since the fault localization apparatus for an optical line is installed in every channel, a wavelength tunable band pass filter is not needed.

Since the fault localization apparatus for an optical line is installed in every channel, when faults are simultaneously and successively generated in more than one of second optical lines 32 connecting the remote node with the optical network units, such faults can be simultaneously measured, unlike the first embodiment of the present invention which measures one by one in order.

Figure 6:
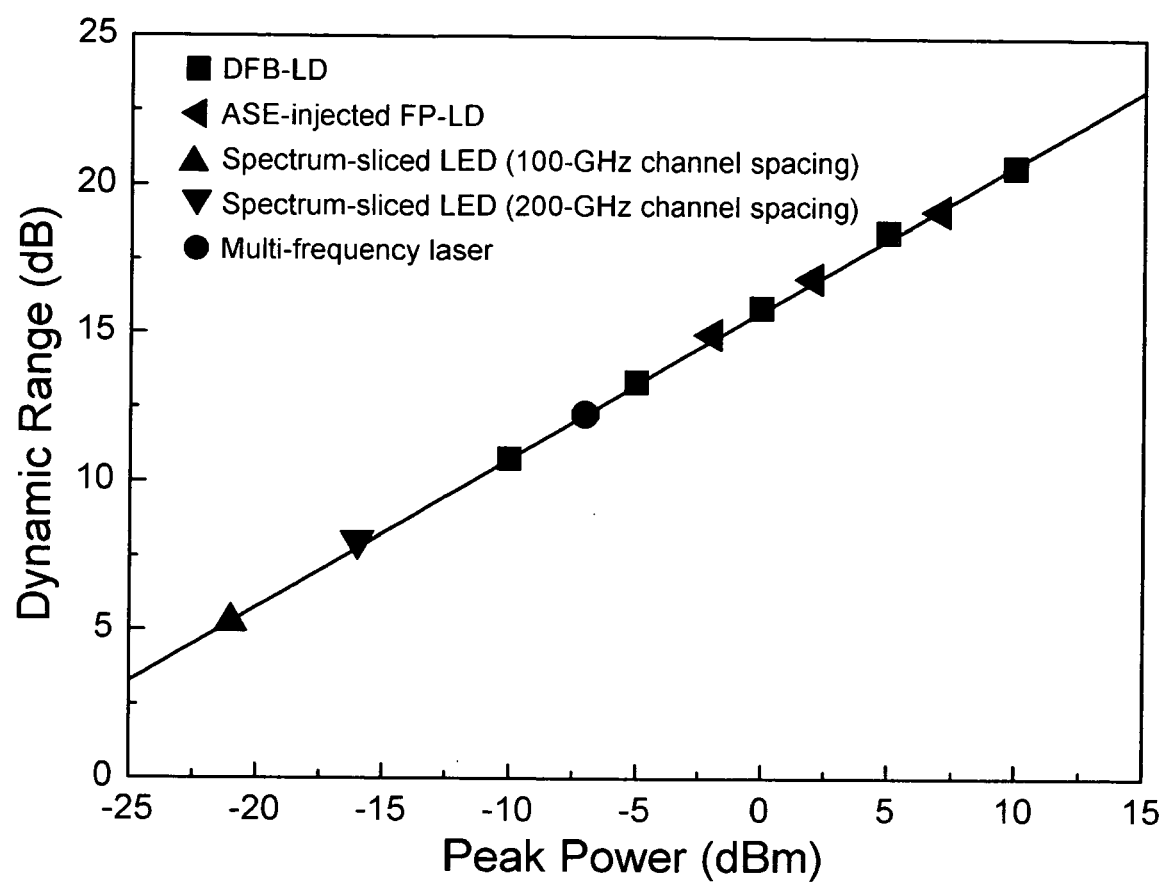
FIG. 6 is a view illustrating a graph measuring performance of a fault localization apparatus for an optical line according to the present invention when various downstream light sources as a monitoring light source are used in a wavelength division multiplexed passive optical network.

FIG. 6 is a view illustrating a graph measuring performance of a fault localization apparatus for an optical line according to the present invention when various downstream light sources as a monitoring light source are used in a wavelength division multiplexed passive optical network.

Performance of the fault localization for an optical line according to the present invention is defined as a dynamic range which is a value of maximum optical fiber loss.

A downstream light source takes the form of light sources for the prior art WDM PON, such as, a distributed feedback laser diode (DFB-LD), an ASE-injected Fabry-Perot laser diode, a spectrum-sliced LED, and a multi-frequency laser.

Referring to FIG. 6, the fault localization apparatus according to the present invention depends on only maximum light amount of a monitoring light source, regardless of types of light sources. Only if the maximum light amount of a light source is a predetermined amount such that network loss value can be measured, can the fault localization apparatus for an optical line according to the present invention be used therein.

Figure 7:
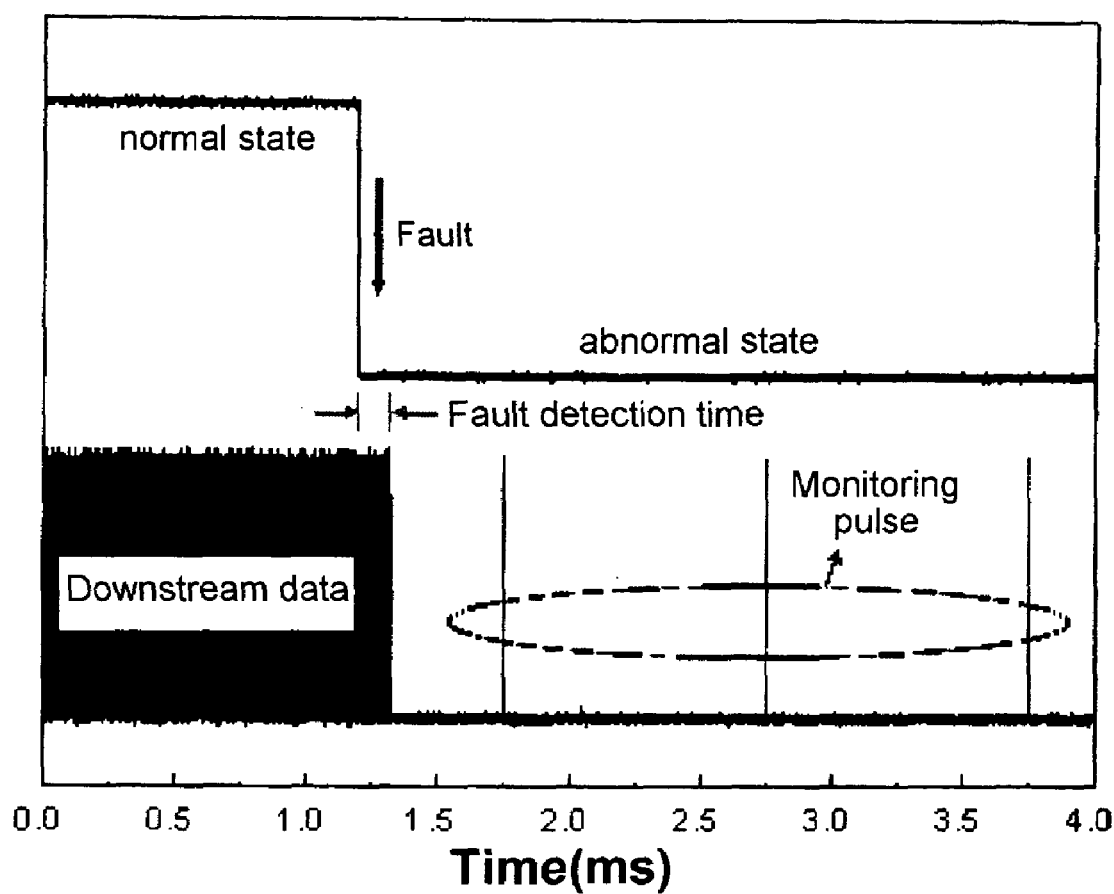
FIG. 7 is a view of a graph illustrating results of when monitoring pulses are applied thereto by a fault localization apparatus for an optical line according to the present invention when a fault occurs.

FIG. 7 is a view illustrating a graph which is a measuring result when monitoring pulses are applied thereto by a fault localization apparatus for an optical line according to the present invention when a fault occurs.

Referring to FIG. 7, when a fault occurs in an optical line, the controller of the fault localization apparatus according to the present invention detects such a fault, and then changes a path of the 2×1 electrical switch connected to the light source of the downstream transmitter, such that a monitoring pulse, instead of the downstream data signal, is applied to the downstream light source.

An interval, between a time point when a fault occurs and a time point when downstream data signal is cut off, is a time interval that the controller takes to determine such a fault. After the controller monitors a receiving state of the upstream optical signal in the upstream receiver, if the upstream optical signal is not received, it determines such a state as a fault. On the other hand, since arrival of the upstream optical signal at the upstream receiver from a fault position is delayed, the fault determination time performed by the controller performs is also delayed by the delay time of the upstream optical signal. Also, since the state of the switch of the downstream transmitter is changed based on fault determination of the controller, time between a time point when a fault occurs and a time when the downstream data signal is cut off is more delayed.

Figure 8:
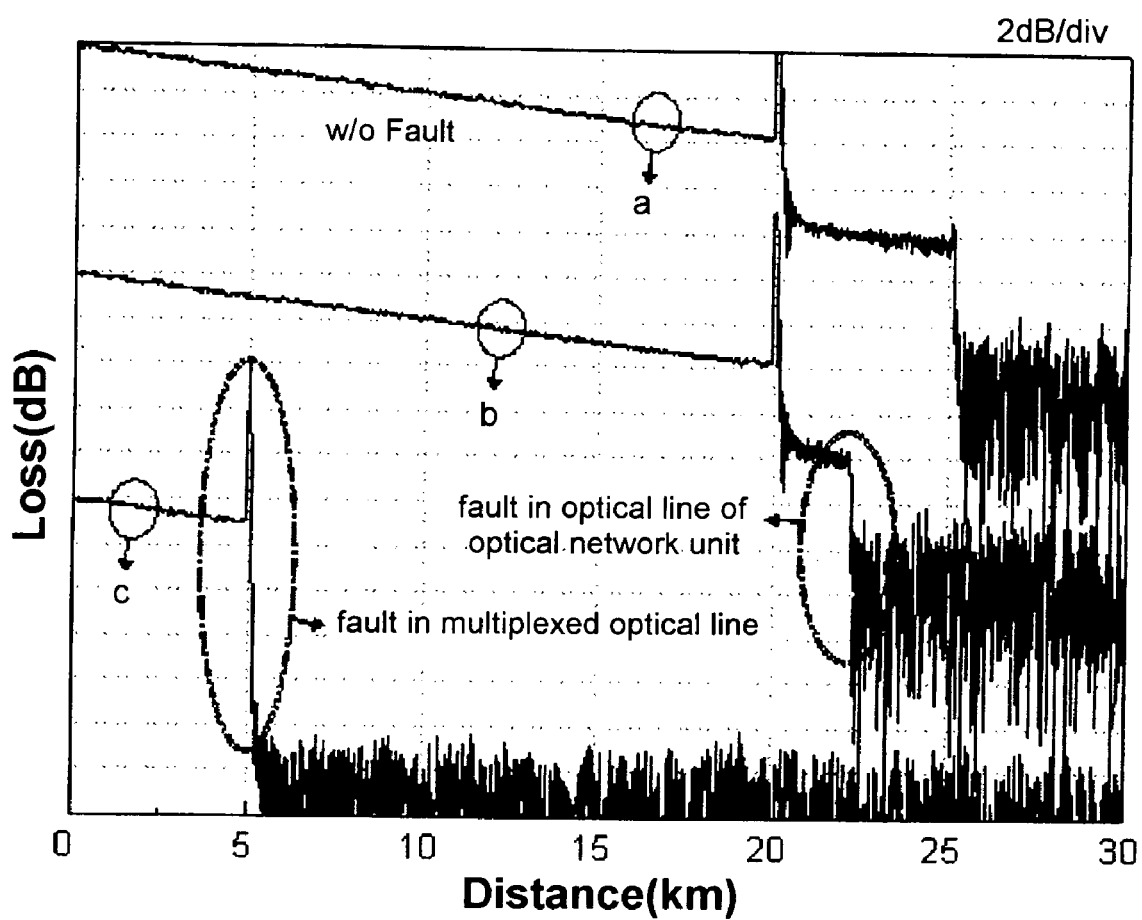
FIG. 8 is loss traces of monitored optical signals measured by a fault localization apparatus for an optical line according to the present invention.

FIG. 8 is loss traces of monitored optical signals measured by a fault localization apparatus for an optical line according to the present invention.

Referring to FIG. 8, reference 'a' is a loss trace of a signal measured when there is no fault in an optical line, and shows, base on distances, a length of an optical line between the central office and the remote node and loss of the optical line, intensity of a signal reflected in the AWG of the remote node and signal loss in the AWG of the remote node, a length of an optical line between the remote node and the optical network unit and loss of the optical line, and intensity of signals reflected in the optical network unit.

Reference 'b' is a loss trace measured when a fault occurs in the optical line connecting the remote node with the optical network unit. Referring to the reference 'b,' the length of an optical line between the central office and the remote node and loss of the optical line, intensity of a signal reflected in the AWG of the remote node, and loss in the AWG of the remote node are shown in a state wherein no fault occurs therein. On the other hand, since a fault occurs in an optical line between the remote node and the optical network unit, signal loss trace at the position wherein a fault occurs disappears such that the signal loss trace is not shown to the optical network unit. Also, since the fault is generated as the optical line is bended, an optical signal largely reflected from the fault position is not generated. The fault localization apparatus of the present invention can detect any fault position even if there is no large reflection signal which is caused by bending of an optical line.

Reference 'c' is a loss trace measured when a fault occurs in an optical line connecting the central office with the remote node. Referring to the reference 'c,' a signal disappears at the fault position of an optical line between the central office and the remote node. Here, since the fault is generated as the optical line is cut, a signal largely reflected at the fault position is generated. Therefore, the fault localization apparatus of the present invention can detect a position of a fault, in which the fault generates a large reflection signal at the fault position, such as cutting of an optical line.

Namely, optical line loss at every position of an optical line and position in which the loss occurs can be detected through the loss traces measured as FIG. 8. Also, not only a fault of an optical line connecting the central office with the remote node but also a fault generated in an optical line connecting the remote node with the optical network units can be precisely detected.

Figure 9:
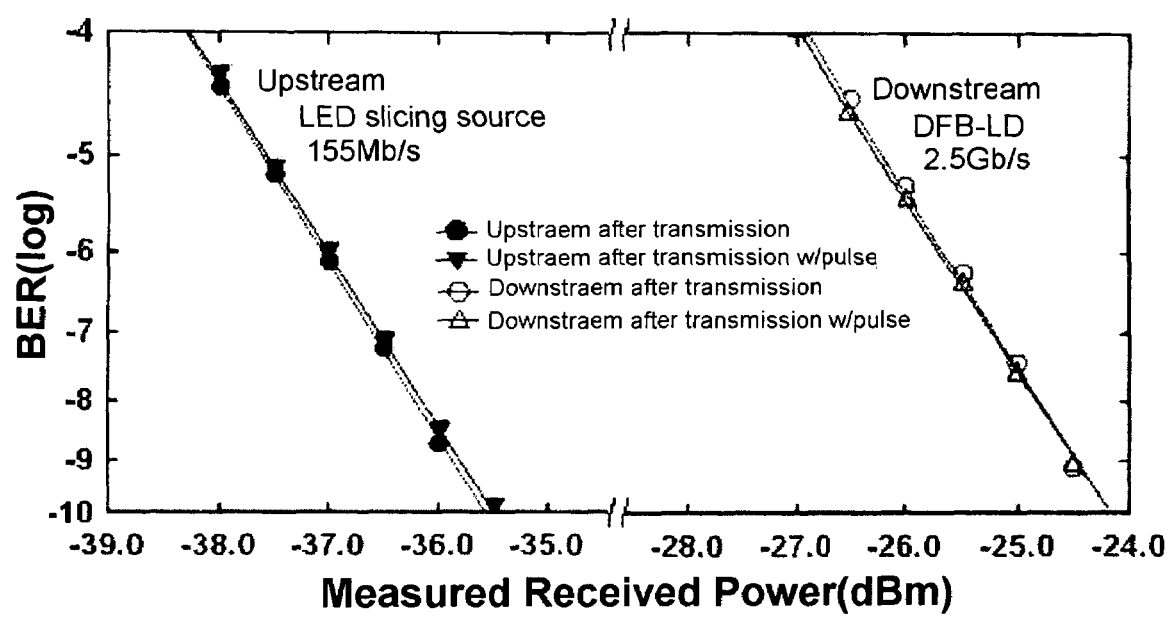
FIG. 9 is graphs measuring transmission qualities of upstream and downstream optical signals in a wavelength division multiplexed passive optical network in which a fault localization apparatus for an optical line according to the present invention is installed.

FIG. 9 is graphs measuring transmission qualities of upstream and downstream optical signals in a wavelength division multiplexed passive optical network in which a fault localization apparatus for an optical line according to the present invention is installed.

More specifically, the graphs of FIG. 9 show results of measuring Bit Error Rate (BER) of upstream and downstream optical signals to analyze effect of transmission quality of data signals by a monitoring optical signal while data signals are transmitted through channels in which faults do not occur, when a fault occurs in a specific channel and the monitoring optical signal is transmitted to monitor a position of the fault in the channel. When receiving light amount and BER are equal to each other in the receiver receiving data, regardless of the monitoring optical signal, it means that the monitoring optical signal does not affect data transmission. In order to test such description, the upstream data signals are transmitted thereto as an LED is directly modulated with a modulation speed of 155 Mb/s, and the downstream data signals are transmitted thereto as a DFB-LD is directly modulated with a modulation speed of 2.5 Gb/s.

Referring to FIG. 9, since the upstream optical signals and the downstream optical signals have the same BER and receiving light amounts, regardless of the monitoring optical signals, the monitoring optical signals do not affect data transmission. Also, it is appreciate that monitoring is possible while data are transmitted thereto.

As mentioned above, the fault localization apparatus for an optical line in a WDM PON according to the present invention can detect positions of faults in optical lines between the central office and the remote nodes, in which signals are multiplexed based on wavelengths and transmitted, since a downstream light source of a channel in which a fault occurs is used as a monitoring light source, and also positions of faults in optical lines between the remote nodes and the optical network units, in which signals are multiplexed based on wavelengths and transmitted. In addition, the fault localization apparatus according to the present invention can be cost-effectively implemented because no additional light source is used.

Furthermore, the fault localization apparatus according to the present invention is installed in the central office and can immediately detect a fault when the fault occurs therein, relatively rapidly prepared its measures for installation, administration, and faults, and can perform monitoring while normal data are transmitted thereto without cutting off normally working channels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fault localization apparatus for an optical line in a wavelength division multiplexed passive optical network (WDM PON), the WDM PON comprising:
   a central office including a multiplexer connected to downstream transmitters and a demultiplexer connected to upstream receivers;
   a remote node including a multiplexer/demultiplexer connected to the multiplexer and the demultiplexer through a first optical line and passive elements; and
   optical network units connected to the multiplexer/demultiplexer through a plurality of second optical lines, respectively,
   the fault localization apparatus comprising:
   a pulse generator generating pulses;
   a 2×1 switch which is installed in each of the downstream transmitters, and connects a data signal generator or a pulse generator with a light source of the downstream transmitter;
   a passive element, installed between the multiplexer and a coupler, for changing paths of monitoring optical signals outputted through the multiplexer which are scattered or reflected backwards;
   a wavelength tunable band pass filter connected to the passive element;
   a controller checking whether the upstream receivers receive signals to check a channel exhibiting an abnormal receiving state, and controlling the 2×1 switch, such that a light source of a downstream transmitter which is selected from among the downstream transmitters is connected to the pulse generator when all of the upstream receivers do not receive signals, or such that a light source of a downstream transmitter which has the same channel of an upstream receiver not receiving a signal is connected to the pulse generator, when the upstream receiver does not receive the signal, and tuning the center wavelength of the wavelength tunable band pass filter to the wavelength of the monitoring optical signal; and
   a receiver for monitoring signals for inputting a monitoring optical signal from the wavelength tunable band pass filter, changing the inputted monitoring optical signal into an electrical signal, converting magnitude variation of the monitoring signal based on time lapse into optical loss values according to distance of the first optical line or one of the second optical lines, and then outputting the converted values, the fault localization apparatus performing such functions that:

a channel exhibiting an abnormal receiving state of a signal received by one of the upstream receivers is checked, a monitoring optical signal is inputted to the multiplexer of the central office, in which the monitoring optical signal is generated by inputting a pulse to a light source of a downstream transmitter corresponding to the channel showing such an abnormal receiving state, such that, after the monitoring optical signal returns after being transmitted through the first optical line and one of the second optical lines, monitoring signal magnitude is measured in a time-domain to detect light loss and fault positions.

2. The fault localization apparatus for an optical line as set forth in claim 1, wherein the controller controls the 2×1 switches such that the light source of each downstream transmitter, which has the same channel as a respective upstream receiver, is connected to the pulse generator in order of a predetermined sequence, when more than two of the upstream receivers do not receive signals, and respectively tunes the center wavelength of the wavelength tunable band pass filter to a wavelength of a downstream transmitter connected to the pulse generator.

3. The fault localization apparatus as set forth in claim 1, wherein the multiplexer, the demultiplexer or the multiplexer/demultiplexer are implemented with an arrayed waveguide grating.

4. The fault localization apparatus as set forth in claim 1, wherein the passive element is a WDM coupler.

5. The fault localization apparatus as set forth in claim 1, wherein the passive element includes an optical circulator or a coupler.

6. A fault localization apparatus for an optical line in wavelength division multiplexed passive optical network (WDM PON), the WDM PON comprising:

a central office including a multiplexer connected to downstream transmitters and a demultiplexer connected to upstream receivers;

a remote node including a demultiplexer connected to the multiplexer of the central office through a first optical line, and a multiplexer connected to the demultiplexer of the central office through a second optical line which is installed therein together with the first optical line; and optical network units, each of which includes a downstream receiver connected to the demultiplexer of the remote node through a third optical line and an upstream transmitter connected to the multiplexer of the remote node through a fourth optical line which is installed therein together with the third optical line, the fault localization apparatus comprising:

a pulse generator generating pulses;

a 2×1 switch which is installed in each of the downstream transmitters, and connects a data signal generator or a pulse generator with a light source of the downstream transmitter;

a passive element, installed in the first optical line, for changing paths of monitoring optical signals outputted through the multiplexer of the central office which are scattered or reflected backwards;

a wavelength tunable band pass filter connected to the passive element;

a controller checking whether the upstream receivers receive signals to check a channel exhibiting an abnormal receiving state, and controlling the 2×1 switch, such that a light source of a downstream transmitter which is selected from among the downstream transmitters is connected to the pulse generator when all of the upstream receivers do not receive signals, and such that a light source of a downstream transmitter which has the same channel as upstream receiver not receiving a signal is connected to the pulse generator, when the upstream receiver does not receive the signal, and tuning the center wavelength of the wavelength tunable band pass filter to the wavelength of the monitoring optical signal; and a receiver for monitoring signals for receiving a monitoring optical signal from the wavelength tunable band pass filter, changing the received monitoring optical signal into an electrical signal, converting magnitude variation of the monitoring signal based on time lapse into optical loss values according to distance of the first optical line or the third optical line, and then outputting the converted values, the fault localization apparatus performing such functions that:

a channel exhibiting an abnormal receiving state, among signals received by the upstream receivers, is checked, and a monitoring optical signal is inputted to the multiplexer of the central office, wherein the monitoring optical signal is generated by inputting a pulse to a light source of a downstream transmitter corresponding to the channel showing such an abnormal receiving state, such that, after the monitoring optical signal returns after being transmitted through the first optical line or the corresponding third optical line, a monitoring signal magnitude is measured in a time-domain to detect light loss, thereby detecting light loss and fault positions.

7. The fault localization apparatus for an optical line as set forth in claim 6, wherein the controller controls the 2×1 switches such that the light source of each downstream transmitter, which has the same channel as a respective upstream receiver, is connected to the pulse generator in a predetermined sequence, when more than two of the upstream receivers do not receive signals, and respectively tunes the center wavelength of the wavelength tunable band pass filter to a wavelength of a downstream transmitter connected to the pulse generator.

8. A fault localization apparatus for an optical line in wavelength division multiplexed passive optical network (WDM PON), the WDM PON comprising:

a central office including a multiplexer connected to downstream transmitters and a demultiplexer connected to upstream receivers;

a remote node including a demultiplexer connected to the multiplexer of the central office through a first optical line, and a multiplexer connected to the demultiplexer of the central office through a second optical line which is installed therein together with the first optical line; and optical network units, each of which includes a downstream receiver connected to the demultiplexer of the remote node through a third optical line and an upstream transmitter connected to the multiplexer of the remote node through a fourth optical line which is installed therein together with the third optical line, the fault localization apparatus comprising:

a pulse generator generating pulses;

a 2×1 switch connecting a data signal generator or the pulse generator with a light source of the downstream transmitter;

a passive element, installed in an optical line connecting the downstream transmitter with the multiplexer of the central office, for changing paths of the monitoring optical signal outputted through the multiplexer of the central office, which is scattered or reflected backwards;

a controller checking whether the upstream receivers receive signals, and controlling the 2×1 switch such that the light source of the downstream transmitter is connected to the pulse generator if an abnormal receiving state is detected; and a receiver for monitoring signals for receiving the monitoring optical signal from the passive element, changing the received monitoring optical signal into an electrical signal, converting magnitude variation of the monitoring signal based on time lapse into optical loss values according to distance of the first optical line or the third optical line, and then outputting the converted values, wherein the fault localization apparatus is installed at each channel, the fault localization apparatus performing such functions that:

a channel exhibiting an abnormal receiving state, among signals received by the upstream receivers, is checked, and a monitoring optical signal is inputted to the multiplexer of the central office, wherein the monitoring optical signal is generated by inputting a pulse to a light source of a downstream transmitter corresponding to the channel showing such an abnormal receiving state, such that, after the monitoring optical signal returns after being transmitted through the first optical line or the corresponding third optical line, a monitoring signal magnitude is measured in a time-domain to detect light loss, thereby detecting light loss and fault positions.

9. A fault localization apparatus for an optical line in a wavelength division multiplexed passive optical network (WDM PON), the WDM PON comprising:

a central office including a multiplexer/demultiplexer whose individual channel ports are each connected to a passive element and then to a set of a downstream transmitter and an upstream receiver;

a remote node including a multiplexer/demultiplexer connected to the multiplexer/demultiplexer of the central office through a first optical line; and optical network units connected to the multiplexer/demultiplexer of the remote node through a plurality of second optical lines, respectively, the fault localization apparatus comprising:

a pulse generator generating pulses;

a 2×1 switch connecting a data signal generator or the pulse generator with a light source of the downstream transmitter;

a passive element, installed in an optical line connected to the downstream transmitter, for changing paths of the monitoring optical signal outputted through the multiplexer/demultiplexer of the central office, which is scattered or reflected backwards;

a controller checking whether the upstream receivers receive signals, and controlling the 2×1 switch such that the light source of the downstream transmitter is connected to the pulse generator if an abnormal receiving state is detected; and a receiver for monitoring signals for receiving the monitoring optical signal from the passive element, changing the received monitoring optical signals into an electrical signal, converting magnitude variations of the monitoring signal based on time lapse into optical loss values according to distance of the first optical line or the respective second optical line, and then outputting the converted values, wherein the fault localization apparatus is installed at each of the passive elements and a set of the downstream transmitter and the upstream receiver, the fault localization apparatus performing such functions that:

a channel exhibiting an abnormal receiving state of a signal received by one of the upstream receivers is checked, a monitoring optical signal is inputted to the multiplexer/demultiplexer of the central office, wherein the monitoring optical signal is generated by inputting a pulse to a light source of a downstream transmitter corresponding to the channel exhibiting such an abnormal receiving state, such that, after the monitoring optical signal returns after being transmitted through the first optical line or one of the second optical lines, monitoring signal magnitude is measured in a time-domain to detect light loss and fault positions.

* * * * *